United States Patent Office 3,324,146
Patented June 6, 1967

3,324,146
PROCESS FOR α,ω-ALKENYL BORATES
Jawad H. Murib, Cincinnati, and Charles A. Bonecutter, Greenhills, Ohio, assignors to National Distillers and Chemical Corporation, New York, N.Y., a corporation of Virginia
No Drawing. Filed Nov. 19, 1963, Ser. No. 324,852
13 Claims. (Cl. 260—345.1)

This invention relates to α,ω-alkenyl borates and to a novel method for preparing same.

Alkenyl borates wherein the single double bond is in the terminal position, i.e., α,ω-alkenyl borates, are of considerable importance as intermediates in the preparation of α,ω-glycols, α,ω-alkenols, bifunctional alkyl boranes, and the like.

Available methods for preparing α,ω-alkenyl borates require α,ω-alkenols as starting materials, the α,ω-alkenyl borates being produced by reaction of the α,ω-alkenols with boric acid, diborane, or boron trichloride. Unfortunately, the practice of these processes is severely limited by the fact that α,ω-alkenols are difficult to prepare and as a result are uneconomical for commercial use.

It is an object of this invention to provide a new and improved route to α,ω-alkenyl borates.

Another object is to provide a route to α,ω-alkenyl borates from readily available starting materials.

A further object is to provide a route to α,ω-alkenyl borates which obviates the use of α,ω-alkenols as starting materials.

It is a still further object of this invention to provide a novel and efficient method for preparing α,ω-glycols, α,ω-alkenols, and α,ω-bifunctional alkyl boranes from readily available starting materials.

Additional objects and advantages will be apparent from the following detailed description.

By the process of the present invention, α,ω-alkenyl borates are prepared from the reaction of diborane or a borane derivative with 2,3-dihydropyran. In carrying out the reaction, the 2,3-dihydropyran is first reacted with diborane or a diborane derivative to form a stable adduct. This adduct is then converted by thermal rearrangement and ring cleavage to the corresponding α,ω-alkenyl borate. The process may be illustrated by the following equations:

(1) 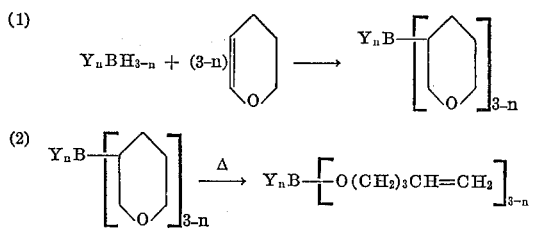

(2) 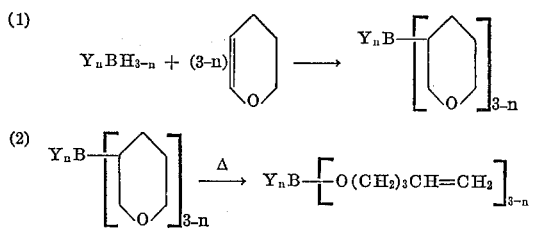

wherein Y represents the same or different radical(s) and is hydrogen or an alkyl, aryl, alkoxy, or halogen radical and n is an integer having a value of 0 to 2, inclusive.

In carrying out the process of this invention, 2,3-dihydropyran is contacted, preferably in ether solution, with a substantially stoichiometric amount of the diborane or borane derivative, i.e., a ratio of one B—H bond per mole of 2,3-dihydropyran. The reaction mixture is then agitated for a brief period of time to ensure complete reaction. Solvent and excess diborane or borane derivative are then removed by vacuum distillation. The resulting reaction product is then heated at an elevated temperature to complete the rearrangement and ring cleavage to the α,ω-alkenyl borate. As the rearrangement and ring cleavage progress, boron migrates from a carbon atom to the oxygen atom and in so doing becomes hydrolyzable. Consequently, the progress of the rearrangement and ring cleavage may be followed by measuring the amount of hydrolyzable boron formed. The α,ω-alkenyl borate product may be recovered as a stable liquid.

The first step of the present process is believed to involve hydroboration of the double bond of the 2,3-dihydropyran in accordance with Equation a below:

(a) 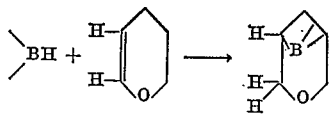

Thermal treatment is then believed to cause migration of the boron atom to the oxygen atom with an accompanying cleavage of the 1,6 carbon-oxygen bond and formation of a terminal alkene bond, as illustrated in Equation b below.

(b) 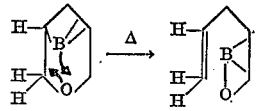

The 2,3-dihydropyran may contain aliphatic or aromatic hydrocarbon substituents, e.g., methyl, ethyl, isopropyl, butyl, phenyl, or alkoxy groups, e.g., methoxy, ethoxy, or isopropoxy, on one or more carbon atoms. It may also contain halogen substituents on the 2 and 3 positions. Examples of suitable substituted compounds include 3-methyl-2,3-dihydropyran, 2-chloro-2,3-dihydropyran, 4-methoxy-2,3-dihydropyran, and the like.

While diborane is preferred as the reactant with the 2,3-dihydropyran, borane derivatives can also be employed. Included are tetramethyldiborane, dichloroborane, dimethoxyborane, diphenylborane, monophenylborane, etc. Ethers suitable for use as solvents during the hydroboration reaction (1) include dimethyl ether, diethyl ether, tetrahydrofuran, monoglyme, diglyme (as used herein, "glyme" is defined as a polyethylene glycol dimethyl ether having the general formula $CH_3(OC_2H_4)_nOCH_3$ where n is an integer from 1 to 4), etc., and mixtures thereof. The ether employed should be sufficiently volatile to enable ready separation by distillation from the hydroboration adduct of the 2,3-dihydropyran. The amount of ether solvent used is not critical; however, sufficient ether should be used to dissolve the reactants and prevent excessive heat build-up during the reaction.

In carrying out the hydroboration reaction it is preferred to use a substantially stoichiometric amount of reactants. Use of an excess of either reactant is not detrimental but causes unnecessary recycle of unused reactant.

Reaction temperature of the hydroboration reaction is not critical. Generally, the reaction temperature ranges from about −78° C. up to the reflux temperature of the ether solvent. When employing diethyl ether as a solvent, the temperature range between about −20° and +30° C. is preferred. Since the hydroboration reaction is exothermic, good control of reaction temperature is afforded by slowly adding the diborane or borane derivative at atmospheric pressure into an ether solution of the 2,3-dihydropyran.

The temperature at which the rearrangement and ring cleavage reaction (2) is effected ranges from about 140° to 300° C., and preferably from about 175° to 250° C. Some rearrangement and cleavage occurs during hydroboration, but the higher temperatures are required to drive the reaction to completion and at a desirable rate. As aforementioned, the progress of the reaction can be followed by the generation of hydrolyzable boron.

For convenience, both the hydroboration and the rearrangement and cleavage reactions are carried out at atmospheric pressure or below, although higher pressures, e.g., up to about 100 p.s.i. or more can be employed. The reactions should be carried out in an inert atmosphere, as in the presence of an inert gas, e.g., nitrogen, argon, helium, etc., to prevent undesirable oxidation of the reactants and products.

The products of the aforedescribed novel process are $\alpha,\omega$-alkenyl borates. Of particular interest is tri($\omega$-pentenyl)borate, prepared from diborane and 2,3-dihydropyran. These $\alpha,\omega$-alkenyl borates can be hydrolyzed with water to produce the corresponding $\alpha,\omega$-alkenol, e.g. 1-pentenol-5.

Of interest also are the products formed upon hydroboration of the $\alpha,\omega$-alkenyl borates followed by hydrolysis. Hydroboration in the same manner as employed in the preparation of the $\alpha,\omega$-alkenyl borates produces polymeric intermediates which in turn can be hydrolyzed to $\omega$-hydroxyalkyl boranes, e.g., tri($\omega$-hydroxypentyl)borane. These compounds can be converted to the corresponding $\alpha,\omega$-diols, e.g., 1,5-pentanediol, by air oxidation. Oxidative dimerization with alkaline silver nitrate produces dimeric $\alpha,\omega$-diols from the $\omega$-hydroxyalkyl boranes e.g. 1,10-decanediol from tri($\omega$-hydroxypentyl)borane. The diols are useful as intermediates for the production of polyurethanes, polyesters, and polycarbonates.

The following examples are presented as illustrations, without limitation, of embodiments of the subject invention.

EXAMPLE I 2,3-dihydropyran, 4.39 grams (52.3 mmoles), was placed in a flask equipped with a magnetic stirrer and a Dry Ice reflux condenser. The flask was cooled to −78° C. with a Dry Ice-acetone bath, and the apparatus was evacuated. Approximately 25 ml. of dry diethyl ether was condensed in the reaction vessel under vacuum. Diborane, 193 cc. (8.7 mmoles) at S.T.P. was slowly admitted as the stirred reaction mixture was gradually warmed to about 0° C. Following the diborane addition, a white solid deposited. The coolant in the Dry Ice condenser was allowed to evaporate, and the contents of the reaction flask were slowly warmed to ambient temperature. The white solid went completely into solution. The ether solvent and unreacted reagents were then removed by pumping under high vacuum. The residual colorless oil, 3.74 grams, exhibited infrared spectra characteristics of vinyl carbon-carbon double bond and B—O—C linkages indicating rearrangement of some of the initial hydroboration product. The presence of infrared absorption bands of boron-carbon bond and ether linkages indicated that some of the pyran rings had not undergone cleavage. Consequently, the product was heated at 145–150° C. for 6 hours to effect complete rearrangement. In the course of heating, the ether absorption band diminished while that of the vinyl became more intense. After an additional 4 hours of heating at 196° C., the reaction mixture was cooled to ambient temperature, treated with 5 ml. of water, and extracted with ether. The ether solution was dried with magnesium sulfate after which the ether solvent was evaporated to give a colorless liquid having primary alcohol and vinyl absorptions consistent with the functional group of 1-pentenol-5. This was confirmed by reacting the resulting alcohol with $\alpha$-naphthyl isocyanate. Recrystallization of the obtained derivative from petroleum ether gave a white solid which melted at 60–61° C., agreeing with a M.P. of 61–62° C. reported for the known $\alpha$-naphthyl urethane of 1-pentenol-5.

EXAMPLE II 2,3-dihydropyran, 2.46 grams (24.3 mmoles), dissolved in 25 ml. of dry diethyl ether, was treated with 108 cc. (4.83 mmoles) of diborane at S.T.P. in the same manner described in Example I. The hydroboration product, 2.34 grams (90.1% yield), was heated at 172°–208° C. for 10.5 hours. Infrared analysis showed the product still contained ether linkage, indicating incomplete cleavage of the pyran ring. The reaction mixture was then heated at 200° C. in a sealed tube for 16 hours. A portion of the reaction mixture, 0.501 gram, was analyzed for hydrolyzable boron content by treatment with water and subsequent titration of the resulting boric acid. The hydrolyzable boron content amounted to 2.1 mmoles of B(OH)$_3$ in contrast to 1.90 mmoles expected from hydrolysis of the completely rearranged product in which all the boron would exist as tri($\omega$-pentenyl)borate, $$B(OCH_2CH_2CH_2CH=CH_2)_3$$

EXAMPLE III 8.99 grams (107 mmoles) of 2,3-dihydropyran, dissolved in 50 ml. of dry diethyl ether, was treated as in Example I with 403 cc. (18 mmoles) of diborane at S.T.P. The hydroboration product, 8.15 grams, corresponding to a 96% yield, was heated in a sealed tube at 204° C. for 16 hours. A sample, 6.31 grams, of the resulting colorless viscous liquid was dissolved in about 25 ml. of diethyl ether and further treated with 273 cc. (12.19 mmoles) of diborane at S.T.P. Removal of the ether by pumping under high vacuum left a glassy colorless solid. Treatment of the solid with water at room temperature followed by extraction with ether, drying with magnesium sulfate, and evaporation of the solvent gave tri($\omega$-hydroxypentyl)borane. This was established by infrared analysis. The product exhibited infrared absorption bands of primary alcohol, boron-carbon bond, and polymethylene absorption of more than three methylene groups in a row. These functional groups are consistent with those of B[(CH$_2$)$_5$OH]$_3$. Further confirmation was obtained by oxidative dimerization of the alkyl chains on boron with alkaline silver nitrate. To a sample of 0.94 gram mixed with 10 ml. of aqueous potassium hydroxide (10% by weight) was added dropwise a solution of 1.5 grams of silver nitrate dissolved in 5 ml. of water. Extraction with benzene gave a product which upon recrystallization from the same solvent gave a white crystalline material which melted at 71.0°–71.5° C., agreeing with the melting point (71.5° C.) of known 1,10-decanediol.

What is claimed is:

1. A process for the preparation of an $\alpha,\omega$-alkenyl borate of the formula $$Y_nB[O(CH_2)_3CH=CH_2]_{3-n}$$

wherein Y is a radical selected from the group consisting of hydrogen, alkyl, aryl, alkoxy, and halogen radicals and $n$ is an integer ranging from 0 to 2, inclusive, which comprises reacting a borane of the formula $Y_nBH_{3-n}$ with 2,3-dihydropyran.

2. A process for the preparation of an $\alpha,\omega$-alkenyl borate of the formula $$Y_nB[O(CH_2)_3CH=CH_2]_{3-n}$$

wherein Y is a radical selected from the group consisting of hydrogen, alkyl, aryl, alkoxy, and halogen radicals and $n$ is an integer ranging from 0 to 2, inclusive, which comprises the steps of
   (1) reacting a borane of the formula $Y_nBH_{3-n}$ with a substantially stoichiometric amount of 2,3-dihydropyran to form an adduct and
   (2) heating said adduct at an elevated temperature to produce the corresponding $\alpha,\omega$-alkenyl borate.

3. The process of claim 2 wherein step (2) is carried out at a temperature between about 140° and 300° C.

4. The adduct obtained from step (1) of claim 2.

5. A process for the preparation of an $\alpha,\omega$-alkenyl borate of the formula $$Y_nB[O(CH_2)_3CH=CH_2]_{3-n}$$

wherein Y is a radical selected from the group consisting of hydrogen, alkyl, aryl, alkoxy, and halogen radicals and $n$ is an integer ranging from 0 to 2, inclusive, which comprises the steps of (1) reacting a borane of the formula $Y_nBH_{3-n}$ with a substantially stoichiometric amount of 2,3-dihydropyran in an ether solvent to form an adduct, (2) removing said ether solvent, and (3) heating said adduct at an elevated temperature to produce the corresponding $\alpha,\omega$-alkenyl borate.

6. The process of claim 5 wherein step (1) is carried out at a temperature between about −78° C. and the reflux temperature of the ether solvent.

7. The process of claim 5 wherein step (3) is carried out at a temperature between about 140° and 300° C.

8. The adduct formed in step (1) of claim 5.

9. A process for preparing tri($\omega$-pentenyl)borate which comprises the steps of (1) reacting six moles of 2,3-dihydropyran with one mole of diborane in an ether solvent to form an adduct, (2) separating said ether solvent from the adduct, and (3) heating said adduct at an elevated temperature to produce tri($\omega$-pentenyl)borate.

10. The process of claim 9 wherein step (1) is carried out at a temperature between about −78° and +30° C.

11. The process of claim 9 wherein step (3) is carried out at a temperature between about 140° and 300° C.

12. The process of claim 9 wherein the ether is diethyl ether.

13. The adduct formed in step (1) of claim 9.

References Cited

UNITED STATES PATENTS

| 3,061,627 | 10/1962 | Lang et al. | 260—462 |
| 3,271,455 | 9/1966 | Cook et al. | 260—462 |

WALTER A. MODANCE, *Primary Examiner.*

JOHN M. FORD, *Assistant Examiner.*